(12) United States Patent
Wennemann et al.

(10) Patent No.: US 7,795,163 B2
(45) Date of Patent: Sep. 14, 2010

(54) GLASS CERAMIC PANEL WITH A PLEASING BLACK DECORATION APPLIED WITH A DECORATIVE PAINT

(75) Inventors: Dietmar Wennemann, Albig (DE); Harald Striegler, Ockenheim (DE)

(73) Assignee: Schott AG, Mainz (DE)

( * ) Notice: Subject to any disclaimer, the term of this patent is extended or adjusted under 35 U.S.C. 154(b) by 761 days.

(21) Appl. No.: 10/920,944

(22) Filed: Aug. 18, 2004

(65) Prior Publication Data

US 2008/0139375 A1    Jun. 12, 2008

(30) Foreign Application Priority Data

Aug. 20, 2003 (DE) ................. 103 38 165

(51) Int. Cl.
*C03C 8/22* (2006.01)
*C03C 8/00* (2006.01)
*C03C 8/14* (2006.01)
*C03C 8/02* (2006.01)

(52) U.S. Cl. ............................. 501/16; 501/14; 501/17; 501/21

(58) Field of Classification Search ..................... 501/14
See application file for complete search history.

(56) References Cited

U.S. PATENT DOCUMENTS

| | | | |
|---|---|---|---|
| 5,137,779 A * | 8/1992 | Hinz et al. ................ | 428/336 |
| 5,212,122 A * | 5/1993 | Pannhorst et al. ........... | 501/69 |
| 6,043,171 A * | 3/2000 | Siebers et al. .............. | 501/66 |
| 6,517,943 B1 | 2/2003 | Beunet et al. | |
| 6,525,300 B1 | 2/2003 | Mitra et al. | |
| 6,930,289 B2 * | 8/2005 | Siebers et al. ............ | 219/452.11 |
| 2003/0218001 A1 | 11/2003 | Siebers et al. | |

FOREIGN PATENT DOCUMENTS

| | | |
|---|---|---|
| DE | 197 21 737 C1 | 11/1998 |
| DE | 198 34 801 A1 | 3/2000 |
| EP | 0 220 333 B1 | 3/1990 |
| EP | 0 460 863 B1 | 12/1995 |
| FR | 2 782 318 | 2/2000 |
| WO | WO 00/04101 * | 1/2000 |
| WO | 02/16279 A1 | 2/2002 |

OTHER PUBLICATIONS

Ohtsuka. Ceramic Pigments. Ceramics vol. 18 (1985) No. 5 p. 377.*

* cited by examiner

*Primary Examiner*—C. Melissa Koslow
*Assistant Examiner*—Matthew E Hoban
(74) *Attorney, Agent, or Firm*—Michael J. Striker

(57) ABSTRACT

The black-colored glass ceramic panel has a cooking surface provided with a smooth black decoration by burning in a decorative paint, which contains a colorless zinc-containing glass flux and up to 10 wt. % of a partially coated pigment. The partially coated pigment consists of 20 to 40 wt. % of a black pigment with a grain size of at most 5μ and a grain size distribution characterized by a $D_{50}<2\mu$ and 60 to 80% by weight of a zinc-free boro-alumino-silicate glass coating the black pigment. The glass flux consists, in wt. %, of $Li_2O$, 0-5; $Na_2O$, 0-5; $K_2O$, <2; $\Sigma Li_2O+Na_2O+K_2O$, 1-10; MgO, 0-3; CaO, 0-4; SrO, 0-4; BaO, 0-4; ZnO, >0-4; $B_2O_3$, 15-27; $Al_2O_3$, 10-20; $SiO_2$, 43-58; $TiO_2$, 0-3; $ZrO_2$, $Sb_2O_3$, 0-2; F, 0-3.

8 Claims, 6 Drawing Sheets

GLASS CERAMIC PANEL WITH A PLEASING BLACK DECORATION APPLIED WITH A DECORATIVE PAINT

BACKGROUND OF THE INVENTION

1. Field of the Invention

The present invention relates to a glass ceramic panel or cook top having a cooking surface provided with a pleasing black decoration by applying a decorative paint to it.

2. Description of the Related Art

Modern cooking ranges have a glass ceramic panel providing a cooking surface, which is partially or also completely coated with decorative paint. These decorative paints are generally divided into the "glazing" or "enamel" category. A "glazing" is generally a glass that is clear or colored in the melt (glass flux), while an "enamel" is a coating material, which contains a colored non-transparent material, such as a pigment, in the glass flux. Colored inorganic compounds can be used as pigments. However the pigments should usually not react or only react slightly with the glass flux.

The decorative paint is burned in at temperatures, which are below the softening point of the glass ceramic. In this process the respective glass compositions of the glazing or the enamel are melted and form a stable bond with the surface of the glass ceramic.

The applied decorative paints have different functions. They serve especially for marking cooking zones, for characterizing touch-panels and for decorative design of the cooking surface. The decorative design has the purpose, among others, of protecting the underlying glass ceramic from usage marks (flecks and scratches).

Particularly popular decorative paints are gray, white and black. The manufacture of a decorative paint, which produces a deep black color on a glass ceramic panel, is very difficult. Instead a dark brown or dark gray color impression is usually produced, when a commercial black pigment and the usual glass flux is used in the decorative paint, because of a chemical reaction between pigment surfaces and glass fluxes during the burning in or baking process. This is caused by the presence of zinc oxide in the glass flux, which shifts the color shade toward brown tones, so that the burned in decorative paint is dark brown or dark gray—but not black. However glass fluxes with a zinc oxide content of up to 4 percent by weight are used in decoration of glass ceramic cooking surfaces, for example GF1 as described in DE 197 21 737 C1, GF2 as described in DE 198 34 801 C2 or GF3 as described in EP 460 863 B1. The reason is that the presence of zinc considerably improves the viscosity behavior during burning in and increases the abrasion resistance of the decorative paint.

Currently no deep black colors can be produced with zinc-containing glass fluxes in spite of careful selection of black pigments.

An additional serious disadvantage of commercial "black" decorative paints is that they are substantially rougher than other decorative paints. Thus e.g. the $R_a$ values according to DIN EN ISO 4288 of the currently used "black" decorative paints ("black 1" and "black 2") are considerably greater than white or gray decorative paints. Since cooking surfaces coated with rough decorative paints very easily collect dirt (e.g. by abrasion of fine metal parts of pans or vessel bottoms) and the rubbed-off particles are especially noticeable, high quality decorative paints for cooking surfaces—especially black decorative paints—should be very smooth ($R_a \leq 0.35\mu$).

The color impressions produced during burn-in using conventional "black" decorative paints are listed in Table I. The color value determination was based on the L*a*b* CIELAB color system. The roughness values of these applied known white, gray and black decorative paints are listed in Table I, which appears hereinbelow.

TABLE I

CONVENTIONAL GRAY AND BROWN ENAMELS MADE FROM DIFFERENT BLACK PIGMENTS AND THEIR COLOR VALUES

| Example | Pigment* | Glass Flux | Color | L* | a* | b* |
|---------|----------|------------|-------|-----|-----|-----|
| 1 | Black 2700 | GF1 | Dark Brown | 25 | 0.2 | −0.4 |
| 2 | Black 2700 | GF2 | Dark Gray | 25 | 0.2 | −1.4 |
| 3 | Black 2700 | GF3 | Gray | 28 | 0.2 | −1.8 |
| 4 | Black 240137 | GF1 | Dark Gray | 24 | 0.2 | −0.6 |
| 5 | Black 240137 | GF2 | Dark Gray | 25 | 0.2 | −1.7 |
| 6 | Black 240137 | GF3 | Gray | 28 | 0.2 | −2.0 |
| 7 | Black PS3000 | GF1 | Dark Brown | 25 | 0.2 | −0.6 |
| 8 | Black PS3000 | GF2 | Dark Gray | 25 | 0.1 | −1.6 |
| 9 | Black PS3000 | GF3 | Dark Gray | 27 | 0.1 | −1.8 |

*The source of Black 2700 is Johnson Matthey, the source of Black 240137 is Degussa and the source of Black PS3000 is Reimbold & Strick.
L* a* and b* are color value parameters in the CIELAB system.

The pigment fraction in all examples of decorative paints listed in Table I was 10 percent by weight (i.e. 90% glass flux) and the coating thickness was from 3 to 4μ. The color measurement was performed with a Mercury 2000 spectrophotometer, Series 1165, of Datacolor (light type, $D_{65}$, Observation angle: 10°). The glass flux compositions were taken from DE 197 21 737 C1 (GF1), DE 198 34 801 C2 (GF2) and EP 460 863 B1 (GF3).

SUMMARY OF THE INVENTION

It is an object of the present invention to provide a glass ceramic panel with a cooking surface having a pleasing black decoration provided by a burned-in decorative paint, so that the decoration has a deep black color and a comparatively smoother or less rough surface.

According to the invention the glass ceramic panel has a melt that is black, the decoration comprises a decorative paint applied to the cooking surface and the decorative paint applied to the black glass ceramic panel contains a colorless glass flux and from 0 to 10 percent by weight of at least one black pigment.

In preferred embodiments of the invention the glass flux has a glass composition, in percent by weight, of:

| | |
|---|---|
| $Li_2O$ | 0-5 |
| $Na_2O$ | 0-5 |
| $K_2O$ | <2 |
| $\Sigma Li_2O + Na_2O + K_2O$ | 1-10 |
| $MgO$ | 0-3 |
| $CaO$ | 0-4 |
| $SrO$ | 0-4 |
| $BaO$ | 0-4 |
| $ZnO$ | 0-4 |
| $B_2O_3$ | 15-27 |
| $Al_2O_3$ | 10-20 |
| $SiO_2$ | 43-58 |
| $TiO_2$ | 0-3 |
| $ZrO_2$ | 0-4 |
| $Sb_2O_3$ | 0-2 |
| F | 0-3. |

Experiments, which will be described in more detail hereinbelow, have shown that the decoration according to the invention has a very little roughness and a very deep black pleasing impression.

The above-described preferred glass composition of the glass flux corresponds to that according to the above-mentioned DE 197 21 737 C1 (The subject matter of this DE reference is also contained in U.S. Pat. No. 6,043,171). The allowed pigment fraction is however preferably limited to 3 percent by weight of pure colored pigments. The subject matter of this DE patent document is hereby expressly incorporated herein by reference thereto.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Roughness values of exemplary decorative paint coatings of the prior art and of the present invention were measured. Five sections with a sample size of 5.6 mm were measured for each paint coating with an optical method according to DIN EN ISO 4288 (FRT MicroGlider® Unit) and roughness values were calculated with the associated standard deviation from the profile data according to DIN EN ISO 4287. Table II below shows the resulting roughness values of a black decorative paint used in the present invention, Black(new), and various prior art decorative paints and perspective views of the respective surfaces are shown in FIGS. 1 to 6, which show their texture or roughness.

Figure 4:
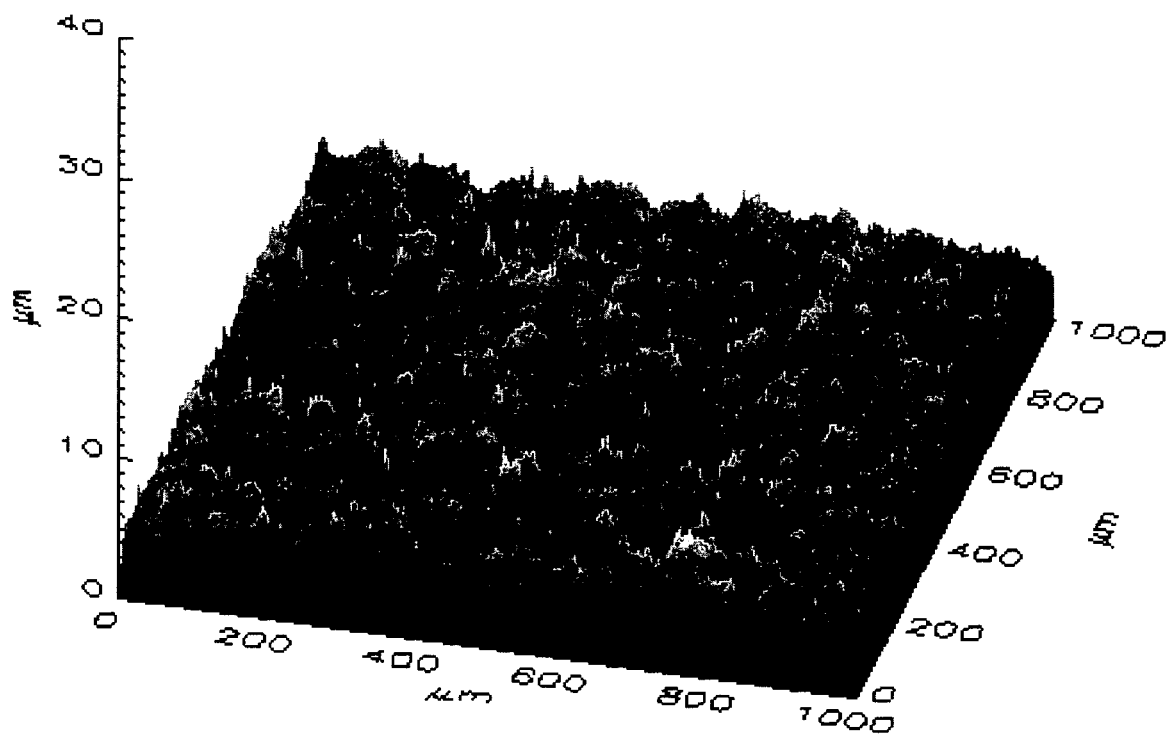
FIG. 4 is a perspective diagrammatic view of the topography of a commercial decorative paint, namely Black 1, showing the surface roughness.
Figure 5:
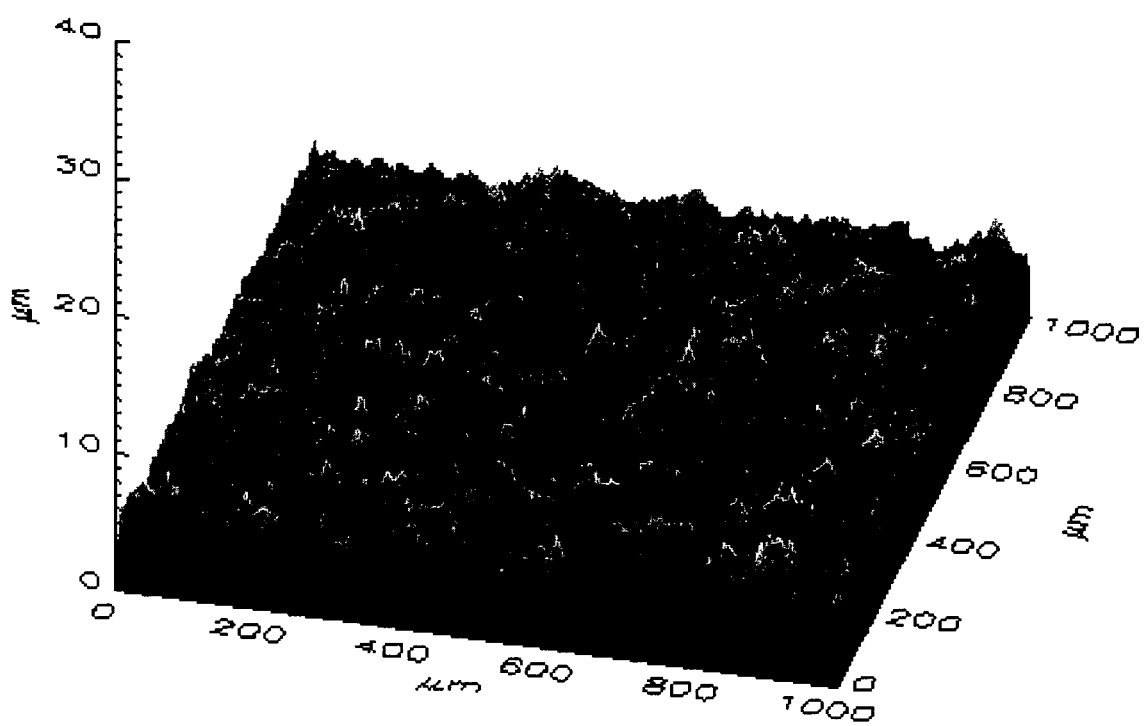
FIG. 5 is a perspective diagrammatic view of the topography of a commercial decorative paint, namely Black 2, showing the surface roughness.
Figure 6:
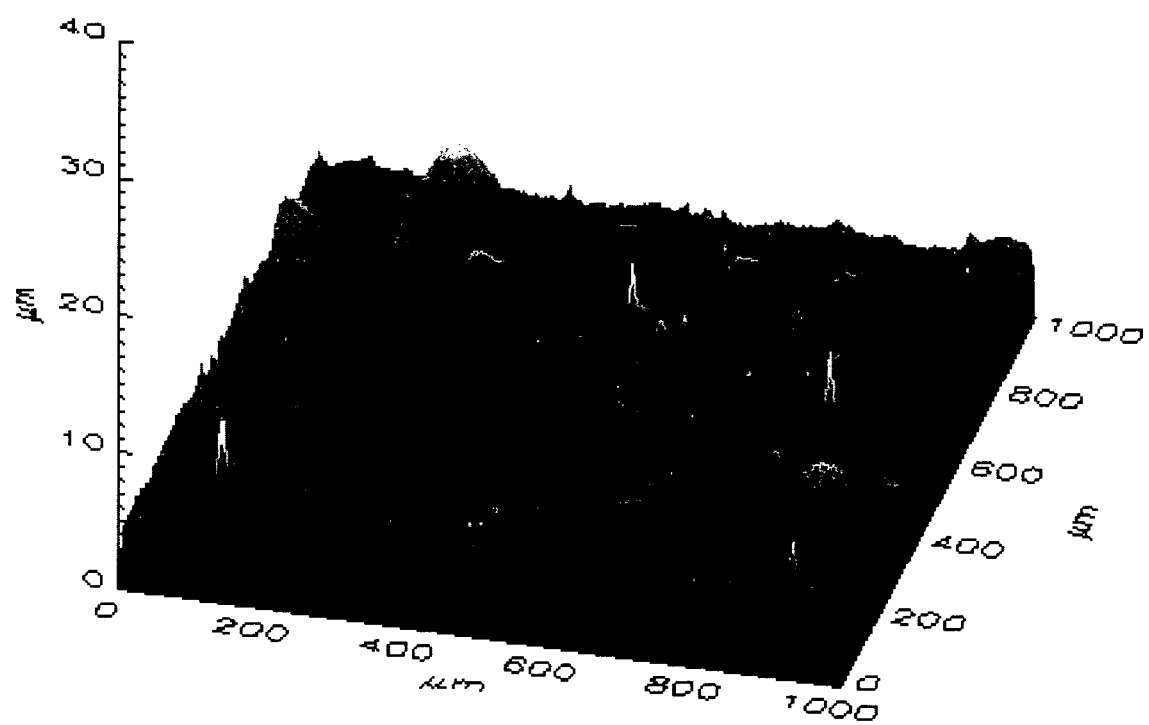
FIG. 6 is a perspective diagrammatic view of the topography of a new decorative paint according to the invention, namely Black(new), which is made from a "coated" or "remelted" black pigment and glass flux GF1.

Because of the high glass flux content of the decorative paint the decoration according to the invention has significantly less roughness, i.e. is much smoother, as shown in FIG. 6, than commercial black decorations of the prior art shown in FIGS. 4 and 5. The smoothness of the decorative paint according to the invention is comparable to that obtained with the white decorative paints, White 1 and White 2 shown in FIGS. 1 and 2. The roughness parameters for the example of the black decoration according to the invention as shown in FIG. 6 are listed under the heading "Black (new)" in the last line of Table II. In contrast the roughness parameters of the examples of the prior art black decorations (Black 1 and Black 2) shown in FIGS. 4 and 5 are listed in lines 4 and 5 of Table II. The example of the black decoration according to the invention shown in FIG. 6 has good roughness properties, i.e. it fulfills the usual requirements for surface cleaning properties, abrasion resistance, adherence and chemical resistance to acids and bases.

TABLE II

ROUGHNESS VALUES FOR DECORATIVE PAINTS

Figure 1:
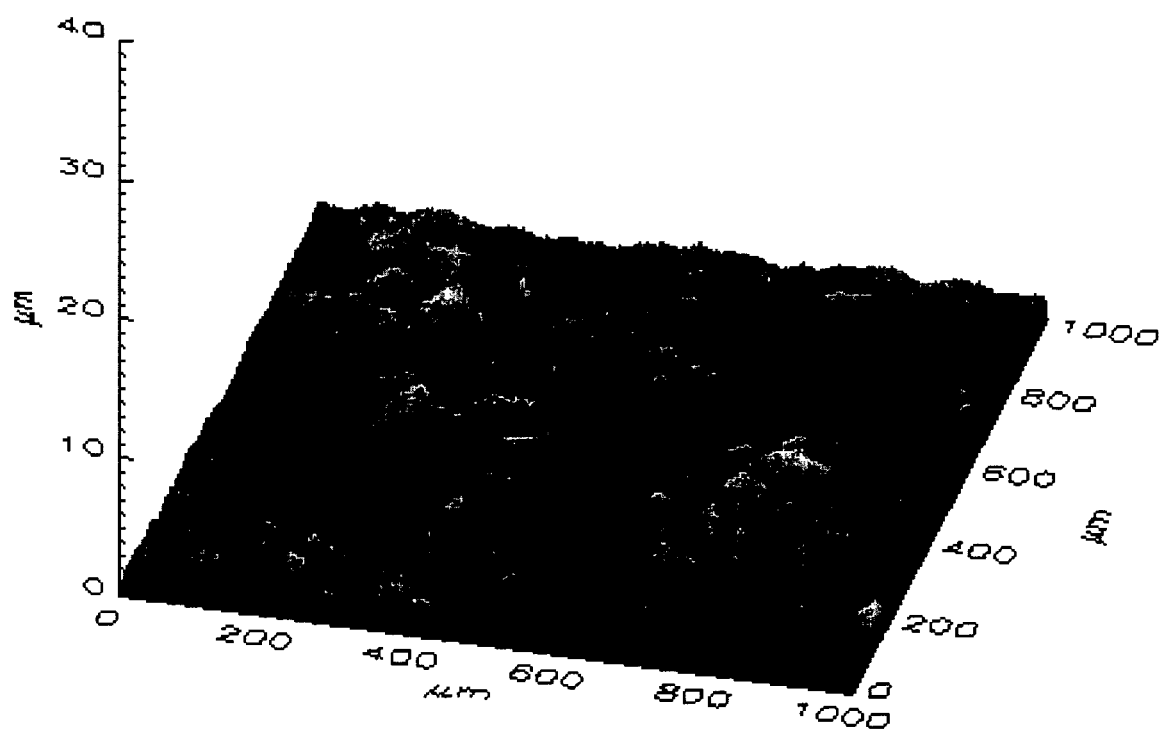
FIG. 1 is a perspective diagrammatic view of the topography of a commercial decorative paint, namely White 1, showing the surface roughness.
Figure 2:
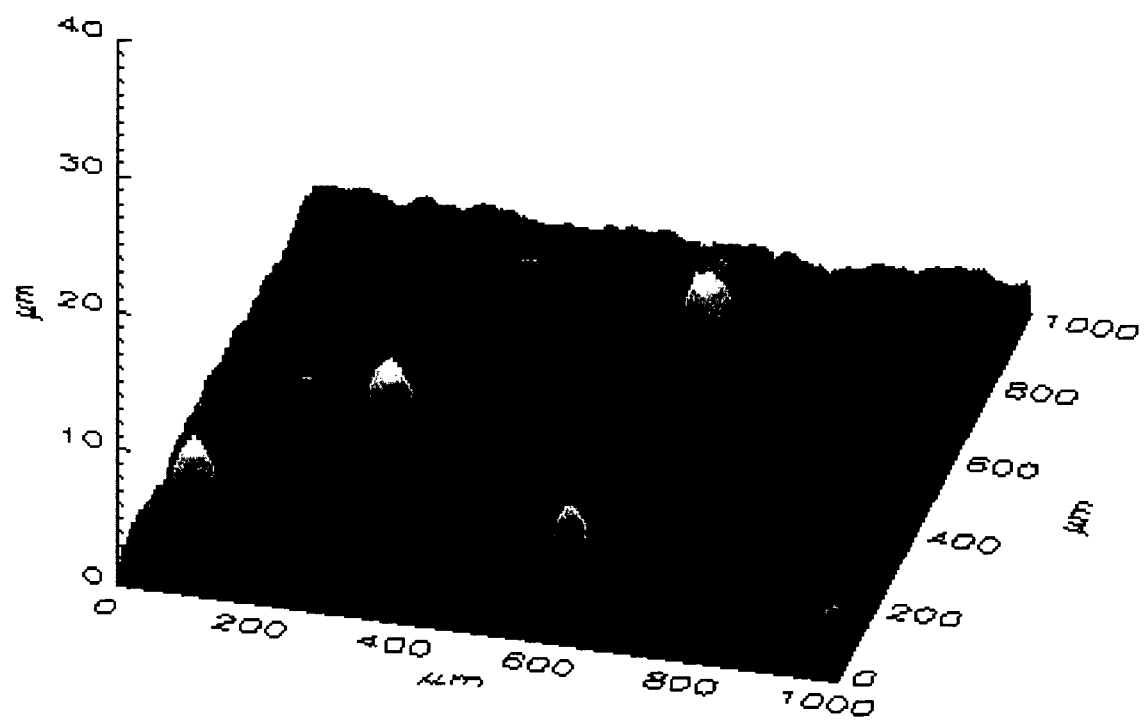
FIG. 2 is a perspective diagrammatic view of the topography of a commercial decorative paint, namely White 2, showing the surface roughness.
Figure 3:
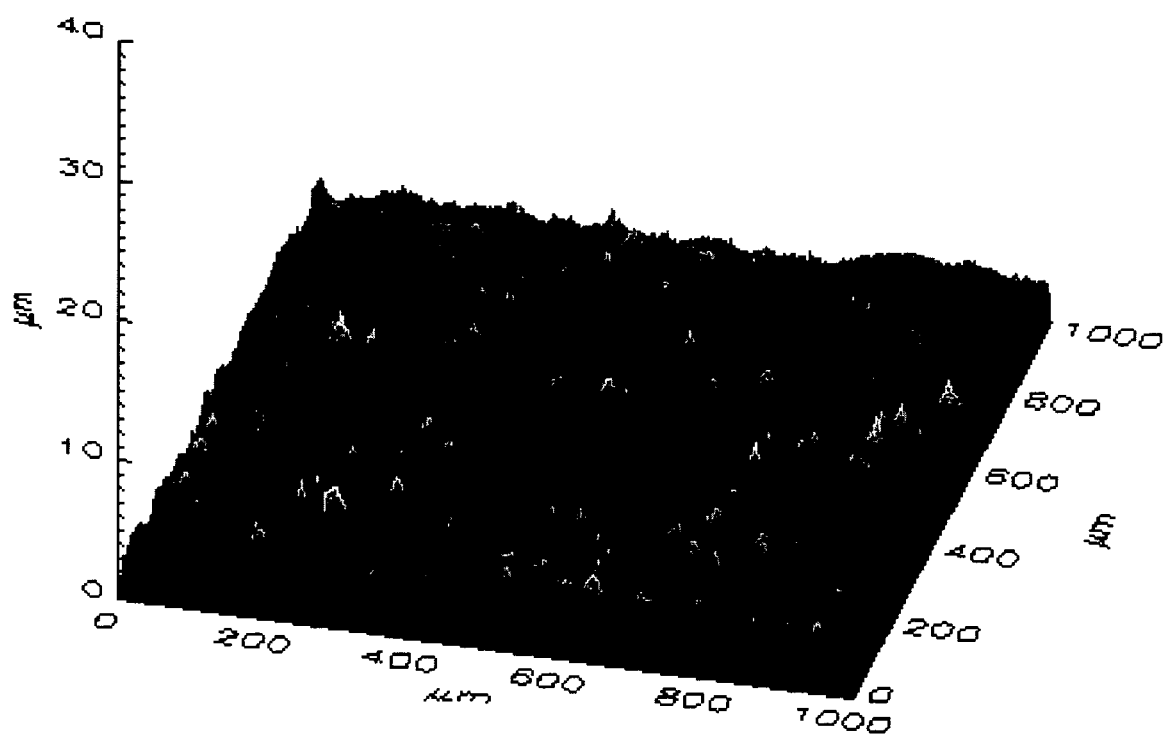
FIG. 3 is a perspective diagrammatic view of the topography of a commercial decorative paint, namely Gray, showing the surface roughness.

| Decorative Paint | Roughness, $R_a[\mu]$ | Roughness, $R_z[\mu]$ | Roughness, $R_{max}[\mu]$ | Topography |
|---|---|---|---|---|
| White 1 | 0.25 ± 0.01 | 1.72 ± 0.16 | 1.94 ± 0.13 | FIG. 1 |
| White 2 | 0.36 ± 0.04 | 2.66 ± 0.29 | 4.06 ± 0.83 | FIG. 2 |
| Gray | 0.37 ± 0.01 | 3.24 ± 0.36 | 4.12 ± 0.59 | FIG. 3 |
| Black 1 | 0.48 ± 0.03 | 4.36 ± 0.38 | 5.15 ± 0.71 | FIG. 4 |
| Black 2 | 0.44 ± 0.06 | 4.33 ± 0.58 | 5.38 ± 0.74 | FIG. 5 |
| Black(new) | 0.29 ± 0.05 | 3.18 ± 0.99 | 5.59 ± 3.74 | FIG. 6 |

Glass ceramic panels are known, which are black in the melt. An especially intense pleasing black decorative effect is obtainable, when the black colored glass ceramic panel comprises a glass ceramic having the following composition, in percent by weight on an oxide basis:

| | |
|---|---|
| $Si_2O$ | 62-68 |
| $Al_2O_3$ | 19.5-22.5 |
| $Li_2O$ | 3.0-4.0 |
| $Na_2O$ | 0-1.0 |
| $K_2O$ | 0-1.0 |
| BaO | 1.5-3.5 |
| CaO | 0-1.0 |
| MgO | 0-0.5 |
| ZnO | 0.5-2.5 |
| $TiO_2$ | 1.5-5.0 |
| $ZrO_2$ | 0-3.0 |
| $MnO_2$ | 0-0.40 |
| $Fe_2O_3$ | 0-0.20 |
| CoO | 0-0.30 |
| NiO | 0-0.30 |
| $V_2O_5$ | 0-0.80 |
| $Cr_2O_3$ | 0-0.20 |
| F | 0-0.20 |
| $Sb_2O_3$ | 0-2.0 |
| $As_2O_3$ | 0-2.0 |
| $\Sigma Na_2O + K_2O$ | 0.5-1.5 |
| $\Sigma BaO + CaO$ | 1.5-4.0 |
| $\Sigma TiO_2 + ZrO_2$ | 3.5-5.5 |
| $\Sigma Sb_2O_3 + As_2O_3$ | 0.5-2.5 |

This black colored glass ceramic, which is marketed under the trademark CERAN HIGHTRANS®, is described in EP 0 220 333 B1. The content of this EP patent application is hereby incorporated here in this disclosure of the present invention by reference.

Alternatively a suitable decoration effect is obtainable when the black colored glass ceramic panel comprises a glass ceramic, which has the following composition, in percent by weight on an oxide basis:

| | |
|---|---|
| $Li_2O$ | 2.5-5.5 |
| $Na_2O$ | 0-3.0 |
| $K_2O$ | 0-3.0 |
| $\Sigma Na_2O + K_2O$ | 0-4.0 |
| MgO | 0-3.0 |
| CaO | 0-2.5 |
| SrO | 0-2.0 |
| BaO | 0-3.5 |
| ZnO | 0-3.5 |

-continued

| | |
|---|---|
| Al$_2$O$_3$ | 18-27 |
| SiO$_2$ | 52-75 |
| TiO$_2$ | 1.2-5.5 |
| ZrO$_2$ | 0-3.0 |
| SnO$_2$ | <1.0 |
| Σ TiO$_2$ + ZrO$_2$ + SnO$_2$ | 2.0-6.0 |
| P$_2$O$_5$ | 0-8.0 |

The dark coloring is adjusted by addition of 0.02 to 0.6 percent by weight of V$_2$O$_5$ and if necessary by addition of other coloring ingredients, such as Cr-, Mn-, Fe-, Co-, Ni-, Se-, Cl-compounds, in order to assist in establishing the color and adjusting definite color locations.

This black colored glass ceramic, which is marketed under the trademark CERAN SUPREMA®, is described in WO 02/16279 A1. The content of this latter prior art reference is similarly incorporated in the disclosure by reference.

The deep black color impression is already obtained according to a first embodiment of the invention with a decorative paint having a glass flux content of 100 percent, e.g. with an unpigmented transparent melting glass flux according to the above-described DE 197 21 737 C1 (GF1).

The quantitative results of measurements of the color impression of the decorative coatings according to this first embodiment of the decorative paints (GF1), which comprises a 100% glass flux, in comparison to other glass fluxes (GF2 according to DE 198 34 801 C2 and GF 3 according to EP 0 460 863 B1), which can be used in decorative paints for the glass ceramic cooking surface because of their low thermal expansion coefficient, are given in Table III hereinbelow. According to Table III a clearly noticeable blue-gray color impression is provided by the other glass fluxes GF2 and GF3 and they are thus unsuitable for producing a deep black color impression according to these methods. The decorative coating produced with the glass flux GF1, on the other hand, is nearly transparent and is somewhat flatter than the glass ceramic, so that the decorative coating on the glass ceramic is observed to be deep black.

TABLE III

COLOR IMPRESSION OF DECORATIVE COATINGS THAT ARE 100% GLASS FLUX

| Glass Flux | Color | Color values | | |
|---|---|---|---|---|
| | | L* | a* | b* |
| GF1 | Black | 24 | 0.0 | -0.6 |
| GF2 | Dark blue-gray | 25 | 0.0 | -2.7 |
| GF3 | Bright blue-gray | 31 | -0.3 | -4.3 |

The color values or parameters of the decorative paints consisting of glass flux alone, which are shown in Table III above, were measured with a Mercury 2000, Series 1165, spectrophotometer of Datacolor (light type, D$_{65}$, Observation angle: 10°). Color values of a 3 to 4µ thick coating of these decorative paints applied to a black glass ceramic (CERAN SUPREMA®) were measured. The unpigmented glass flux compositions were taken from DE 197 21 737 C1 (GF1), DE 198 34 801 C2 (GF2) and EP 460 863 B1 (GF3). The color values are expressed as L*a*b* in the CIELAB system.

So that the coating of the undecorated regions of a black glass ceramic panel is more distinguishable, according to a second embodiment of the invention, about 2 percent by weight of a black pigment (e.g. a Cr—Fe—Co—Mn spinel) with a maximum grain size of 5µ (D$_{50}$<2µ) can be added. Because of that the transparency of the black decorative paint is reduced, whereby the conspicuousness of the decorative paint is clearly increased on the glass ceramic. Without that the decorative paint looses its deep black color impression or is too rough.

However with a zinc-containing glass flux, such as GF1, with more than 2 percent by weight pigment additive (e.g. at 2.7%), already a slight change of black color impression to a brown color was observed (when b*≧-0.3 and a≧+0.1 with L*=24). The continuous change of the color location, i.e. the increase of a* and b* values with increasing pigment fraction, was measured instrumentally. The color is increasingly "red" and "yellow", as seen in Table IV. The intensity of the black color impression of the decorative paint cannot be further increased simply by addition of more black pigment, because the brown color shade is observable with the eye when more than 2% pigment is added.

TABLE IV

DEPENDENCE OF COLOR PARAMETERS OF THE DECORATIVE PAINT ON THE PIGMENT FRACTION

| Wt. %, Pigment | Color | Color Parameters | | |
|---|---|---|---|---|
| | | L* | a* | b* |
| 0 | Black | 23.6 | 0.0 | -0.6 |
| 2 | Black | 23.7 | 0.1 | -0.4 |
| 2.7 | Black-brown | 23.8 | 0.1 | -0.3 |
| 3 | Black-brown | 23.9 | 0.1 | -0.3 |
| 10 | Black-brown | 24.2 | 0.1 | -0.3 |
| 15 | Dark brown | 25.2 | 0.2 | +0.2 |
| 20 | Gray brown | 25.9 | 0.1 | +0.1 |

The decorative paint, whose color parameters were tabulated in Table IV above, contains glass flux GF1 (DE 197 21 737 C1) and pigment PG1, which is a Cr—Fe—Co—Mn Spinel. Pigment PG1 contains 11% chromium (III), 15% Fe(II/III), 20% cobalt (II) and 20% Manganese (II/III). The decorative paint coating measured had a coating thickness of 3 to 4µ. The measurements were performed, as above, with a Mercury 2000 spectrophotometer, Series 1165, of Datacolor (light type, D$_{65}$, Observation angle: 10°).

However the brown color can be suppressed at overall pigment concentrations up to 3, or about 3, percent by weight is reached, when the black pigment (PG1, e.g. Cr—Fe—Co—Mn spinel) is re-melted together with a glass, which does not attack the pigment surface, and is subsequently ground fine (maximum grain size about 10µ, D$_{50}$>5µ). The glass used to make this at least partially coated or re-melted pigment PG2 can, for example, be a zinc-free boro-alumino-silicate glass. The proportion of the boro-alumino-silicate glass usually amounts to from 60 to 80%, while the coloring agent or pigment fraction in the at least partially coated pigment is from 20 to 40%. The pigment fraction in the decorative paint can be increased to about 3% by weight when using an at least partially coated "pigment" PG2 comprising, for example, 70% by weight glass and 30 percent by weight coloring body, without producing a brownish color. That corresponds to 10 percent by weight of the at least partially coated pigment in the powdery paint mixture. Preferably the pigment fraction in the decorative paint amounts to 2.7% by weight, which corresponds to 9 percent by weight of the at least partially coated or re-melted pigment.

TABLE V

COMPARISON OF COLORS OF DECORATIVE PAINT
PRODUCED WITH NON-REMELTED BLACK PIGMENT
WITH RE-MELTED BLACK PIGMENT

| Wt. %, Pigment | Pigment Composition | | Color Parameters | | | |
|---|---|---|---|---|---|---|
| | Glass flux fraction | Pigment fraction | L* | a* | b* | Color |
| 0 | 100% GF1 | 0% | 23.6 | 0.0 | −0.6 | Black |
| 2.7 | 91% GF1 | 9% PG2 | 24.8 | 0.1 | −0.6 | Black |
| 2.7 | 97.3% GF1 | 2.7% PG1 | 23.8 | 0.1 | −0.3 | Black-brown |

Pigments: PG1: Cr—Fe—Co—Mn Spinel
PG2: coated or re-melted PG1 (70% by weight glass flux, 30% by weight pigment - PG1)
Glass flux: GF1 (DE 197 21 737 C1)
Coating thickness: 3-4 μ
Spectrophotometer: Mercury 2000, Series 1165 (Datacolor), $D_{65}$, 10°

This latter decorative paint according to the invention has a color with lower a* and b* values, which are identical with values of the decorative paint made from unpigmented glass flux, as shown by the values listed in Table V below. Only the L* value is somewhat increased, i.e. the color is somewhat "grayer", which however is still not observable with the eye as a weakening of the black color impression. The increase of the L* values is based according to the current knowledge on the burned-in boro-silicate-alumino-silicate glass, which strongly reduces the transparency of the decorative paint, so that the decorative paint on the black glass ceramic panel is more clearly observed than the unpigmented glass flux or the glass flux containing 2% pigment.

Because of the deep black pleasingly lustrous appearance of the decorative paint on a black glass ceramic the glass ceramic surface decorated with a fine grid or pattern appears at first glance as if it had a structure or pattern (the decorative paint is not observed in its function as paint). The effect opens up new possibilities for design of the glass ceramic cooking surfaces. Of course the developed black decorative colors with a decorative pattern can be used as a so-called background texture, so that the glass ceramic cooking surface is provided with a very high quality design. The new decorative paint can thus be characterized as "texture paint". The roughness Ra of the background texture is thus ≦0.35μ.

The making of the glass fluxes for the decorative paint, their pigments and their application and the burning on of the decorative paint on the glass ceramic panel occurs according to known methods, for example as described in DE 197 21 737 C1. Explicit reference to this disclosure is made in the present application.

The disclosure in German Patent Application 103 38 165.1-45 of Aug. 20, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a glass ceramic cook top having a cooking surface provided with a pleasing black decoration by applying a decorative paint to it, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A decorated glass ceramic panel with a cooking surface, said cooking surface being provided with a black decoration by means of a burned-in decorative paint, wherein said decorative paint is applied to said cooking surface to form said black decoration, said glass ceramic panel has a black color and said decorative paint on the cooking surface contains a colorless zinc-containing glass flux and at least one partially coated pigment;

wherein said at least one partially coated pigment consists of 20 to 40% by weight of a black pigment and 60 to 80% by weight of a zinc-free boro-alumino-silicate glass, said zinc-free boro-alumino-silicate glass coating said black pigment;

wherein said black pigment has a grain size of at most 5μ, and a grain size distribution characterized by a $D_{50}$<2μ and consists of a Cr—Fe—Co—Mn spinel; and wherein said colorless zinc-containing glass flux consists, in percent by weight, of:

| | |
|---|---|
| $Li_2O$ | 0-5 |
| $Na_2O$ | 0-5 |
| $K_2O$ | <2 |
| $\Sigma Li_2O + Na_2O + K_2O$ | 1-10 |
| MgO | 0-3 |
| CaO | 0-4 |
| SrO | 0-4 |
| BaO | 0-4 |
| ZnO | 0-4 |
| $B_2O_3$ | 15-27 |
| $Al_2O_3$ | 10-20 |
| $SiO_2$ | 43-58 |
| $TiO_2$ | 0-3 |
| $ZrO_2$ | 0-4 |
| $Sb_2O_3$ | 0-2 |
| F | 0-3; | wherein said decorative paint consists of said at least one partially coated pigment and said colorless zinc-containing glass flux; and wherein said decorative paint contains said at least one partially coated pigment in an amount of from 9 to 10 percent by weight.

2. The glass ceramic panel as defined in claim 1, which has a composition in percent by weight of:

| | |
|---|---|
| $Si_2O$ | 62-68 |
| $Al_2O_3$ | 19.5-22.5 |
| $Li_2O$ | 3.0-4.0 |
| $Na_2O$ | 0-1.0 |
| $K_2O$ | 0-1.0 |
| BaO | 1.5-3.5 |
| CaO | 0-1.0 |
| MgO | 0-0.5 |
| ZnO | 0.5-2.5 |
| $TiO_2$ | 1.5-5.0 |
| $ZrO_2$ | 0-3.0 |
| $MnO_2$ | 0-0.40 |
| $Fe_2O_3$ | 0-0.20 |
| CoO | 0-0.30 |
| NiO | 0-0.30 |
| $V_2O_5$ | 0-0.80 |
| $Cr_2O_3$ | 0-0.20 |
| F | 0-0.20 |
| $Sb_2O_3$ | 0-2.0 |

-continued

|  |  |
|---|---|
| $As_2O_3$ | 0-2.0 |
| $\Sigma Na_2O + K_2O$ | 0.5-1.5 |
| $\Sigma BaO + CaO$ | 1.5-4.0 |
| $\Sigma TiO_2 + ZrO_2$ | 3.5-5.5 |
| $\Sigma Sb_2O_3 + As_2O_3$ | 0.5-2.5. |

3. The glass ceramic panel as defined in claim 1, which has a composition in percent by weight of:

|  |  |
|---|---|
| $Li_2O$ | 2.5-5.5 |
| $Na_2O$ | 0-3.0 |
| $K_2O$ | 0-3.0 |
| $\Sigma Na_2O + K_2O$ | 0-4.0 |
| $MgO$ | 0-3.0 |
| $CaO$ | 0-2.5 |
| $SrO$ | 0-2.0 |
| $BaO$ | 0-3.5 |
| $ZnO$ | 0-3.5 |
| $Al_2O_3$ | 18-27 |
| $SiO_2$ | 52-75 |
| $TiO_2$ | 1.2-5.5 |
| $ZrO_2$ | 0-3.0 |
| $SnO_2$ | <1.0 |
| $\Sigma TiO_2 + ZrO_2 + SnO_2$ | 2.0-6.0 |
| $P_2O_5$ | 0-8.0 |
| $V_2O_5$ | 0.02-0.6, | and at least one coloring ingredient selected from the group consisting of Cr-, Mn-, Fe-, Co-, Ni-, Se- and Cl-compounds for adjustment and assisting in production of a black color shade.

4. The glass ceramic panel as defined in claim 1, wherein said at least partially coated pigment comprises 70% by weight of said zinc-free boro-alumino-silicate coating glass and 30% by weight of said black pigment.

5. The glass ceramic panel as defined in claim 1, wherein the decorative paint is applied in the form of a background texture as a decoration with a roughness $R_a \leq 0.35\mu$.

6. The glass ceramic panel as defined in claim 1, wherein said decorative paint has a layer thickness of from 1 to 7μ.

7. The decorated glass ceramic panel as defined in claim 1, wherein said Cr—Fe—Co—Mn spinel contains 11% chromium (III), 15% Fe (II/III), 20% cobalt (II) and 20% Manganese (II/III) and is resistant to a temperature at which said decorative paint is burned in.

8. A decorated glass ceramic panel with a cooking surface, said cooking surface being provided with a black decoration by means of a burned-in decorative paint, wherein said decorative paint is applied to said cooking surface to form said black decoration, said glass ceramic panel has a black color and said decorative paint on the cooking surface contains 91 percent by weight of a colorless zinc-containing glass flux and 9 percent by weight of at least one partially coated pigment;

wherein said at least one partially coated pigment consists of 20 to 40% by weight of a black pigment and 60 to 80% by weight of a zinc-free boro-alumino-silicate glass, said zinc-free boro-alumino-silicate glass coating said black pigment;

wherein said black pigment has a grain size of at most 5μ and a grain size distribution characterized by a $D_{50} < 2\mu$ and consists of a Cr—Fe—Co—Mn spinel; and wherein said colorless zinc-containing glass flux consists, in percent by weight, of:

|  |  |
|---|---|
| $Li_2O$ | 0-5 |
| $Na_2O$ | 0-5 |
| $K_2O$ | <2 |
| $\Sigma Li_2O + Na_2O + K_2O$ | 1-10 |
| $MgO$ | 0-3 |
| $CaO$ | 0-4 |
| $SrO$ | 0-4 |
| $BaO$ | 0-4 |
| $ZnO$ | 0-4 |
| $B_2O_3$ | 15-27 |
| $Al_2O_3$ | 10-20 |
| $SiO_2$ | 43-58 |
| $TiO_2$ | 0-3 |
| $ZrO_2$ | 0-4 |
| $Sb_2O_3$ | 0-2 |
| F | 0-3. |

* * * * *